United States Patent
Youtz et al.

(10) Patent No.: US 10,292,053 B2
(45) Date of Patent: May 14, 2019

(54) DISABLING USER EQUIPMENT RADIO COMMUNICATION OVER AN UNLICENSED RADIO FREQUENCY SPECTRUM BAND DURING WLAN OPERATIONS

(71) Applicant: Verizon Patent and Licensing Inc., Arlington, VA (US)

(72) Inventors: Andrew E. Youtz, Princeton, NJ (US); Siva Sandeep Dhandu, Princeton, NJ (US); Stephane Chaysinh, Basking Ridge, NJ (US); Iftekhar Rahman, Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 119 days.

(21) Appl. No.: 15/042,645

(22) Filed: Feb. 12, 2016

(65) Prior Publication Data

US 2017/0238188 A1  Aug. 17, 2017

(51) Int. Cl.
*H04W 16/14* (2009.01)

(52) U.S. Cl.
CPC .................... *H04W 16/14* (2013.01)

(58) Field of Classification Search
CPC ..... H04W 88/06; H04W 8/24; H04W 76/046; H04W 64/00; H04W 48/16; H04W 72/048; H04W 36/0066; H04W 16/14; Y02B 60/50
USPC ........................................................ 455/454
See application file for complete search history.

(56) References Cited

U.S. PATENT DOCUMENTS

| | | | | |
|---|---|---|---|---|
| 2011/0216732 A1* | 9/2011 | Maeda | ..................... | H04W 4/08 370/329 |
| 2013/0322302 A1* | 12/2013 | Gholmieh | ............. | H04W 36/24 370/280 |
| 2015/0215832 A1* | 7/2015 | Fitzpatrick | ............ | H04W 48/18 455/426.1 |
| 2015/0351054 A1* | 12/2015 | Immonen | ............ | H04W 52/243 370/311 |

OTHER PUBLICATIONS

3rd Generation Partnership Project, "3GPP TS 24.301 V13.4.0 (Dec. 2015): Technical Specification Group Core Network and Terminals; Non-Access-Stratum (NAS) protocol for Evolved Packet System (EPS); Stage 3 (Release 13)," http://www.3gpp.org/ftp/specs/archive/24_series/24.301/, Dec. 16, 2015, 401 pages.

(Continued)

*Primary Examiner* — Marcus Hammonds

(57) ABSTRACT

A wireless local area network (WLAN) operations status with regard to a wireless access point may be changed for a user equipment (UE). A request, based on changing the WLAN operations status for the UE, may be sent to a base station. The request may cause the base station to send, to the UE, a first message based on the request. The first message may be received from the base station. A second message, based on the first message, may be sent to the base station. The second message may cause the base station to change availability of a radio service based on changing the WLAN operations status for the UE.

20 Claims, 5 Drawing Sheets

(56) References Cited

OTHER PUBLICATIONS

3rd Generation Partnership Project, "3GPP TS 36.331 V12.7.0 (Sep. 2015): Technical Specification Group Radio Access Network; Evolved Universal Terrestrial Radio Access (E-UTRA); Radio Resource Control (RRC); Protocol specification (Release 12)," http://www.3gpp.org/ftp/specs/archive/36_series/36.331/, Sep. 24, 2015, 453 pages.
Johnson, "Long Term Evolution in Bullets," 2nd. Edition, 2012, pp. 429-432, 6 pages.
Wikipedia, "LTE in unlicensed spectrum," https://en.wikipedia.org/wiki/LTE_in_unlicensed_spectrum, Dec. 7, 2015, 3 pages.
Wikipedia, "Mobile data offloading," https://en.wikipedia.org/wiki/Mobile_data_offloading, Sep. 1, 2015, 5 pages.

* cited by examiner

DISABLING USER EQUIPMENT RADIO COMMUNICATION OVER AN UNLICENSED RADIO FREQUENCY SPECTRUM BAND DURING WLAN OPERATIONS

BACKGROUND

User equipment may be capable of communicating using one or more radio access technologies. For example, some user equipment may be capable of communicating with a wireless operator's radio access network (e.g., a long term evolution (LTE) network) over the wireless operator's licensed radio frequency (RF) spectrum band, communicating with the wireless operator's radio access network over an unlicensed RF spectrum band (e.g., for LTE in unlicensed spectrum service, such as LTE for Unlicensed (LTE-U) or Licensed Assisted Access (LAA)), and/or communicating with a wireless network (e.g., a wireless local area network (WLAN)) for WLAN operations. A licensed RF spectrum band may refer to an RF spectrum band that has been licensed to a wireless operator by an appropriate regulatory agency (e.g., the Federal Communications Commission (FCC) in the United States). An unlicensed RF spectrum band may refer to an RF spectrum band (e.g., the 2.4 gigahertz (GHz) and 5 GHz RF spectrum bands) that has not been licensed and is open for shared use by any device that complies with regulatory agency rules for communicating via the RF spectrum band.

DETAILED DESCRIPTION OF PREFERRED EMBODIMENTS

The following detailed description of example implementations refers to the accompanying drawings. The same reference numbers in different drawings may identify the same or similar elements.

The unlicensed RF spectrum band that a user equipment might use to communicate with a wireless operator's radio access network (e.g., for LTE in unlicensed spectrum service, such as LTE-U or LAA) might be the same as the RF spectrum band (e.g., the 2.4 GHz RF spectrum band or the 5 GHz RF spectrum band) that the user equipment might use to perform WLAN operations via a wireless network (e.g., WiFi operations via a WiFi access point). For example, the user equipment might connect to a 5 GHz WiFi access point for WiFi operations, while the wireless operator might desire that the user equipment use the 5 GHz RF spectrum band for LTE in unlicensed spectrum service. Some user equipment might be unable to simultaneously perform WLAN operations and communicate with a wireless operator's radio access network (e.g., for LTE in unlicensed spectrum service, such as LTE-U or LAA) over the same unlicensed RF spectrum band.

Implementations described herein may permit a user equipment to notify a wireless operator's base station that the user equipment is unavailable for radio services (e.g., LTE radio services) using an unlicensed RF spectrum band, and/or may permit the user equipment to cause disabling of the radio services that use the unlicensed RF spectrum band, when the user equipment is using the unlicensed RF spectrum band for WLAN operations. For example, implementations described herein may permit a user equipment, which is using the 5 GHz RF spectrum band for WiFi operations, to cause a wireless operator's base station (e.g., an evolved Node B (eNB)) to disable, for the user equipment, LTE in unlicensed spectrum service (e.g., LTE-U or LAA) using the 5 GHz RF spectrum band. In this way, implementations described herein may reduce potential interference between WLAN operations and using an unlicensed RF spectrum band to communicate with a wireless operator's radio access network (e.g., for LTE in unlicensed spectrum service, such as LTE-U or LAA). Implementations described herein may additionally, or alternatively, permit a user equipment to selectively engage in WLAN operations rather than using an unlicensed RF spectrum band to communicate with a wireless operator's radio access network (e.g., for LTE in unlicensed spectrum service, such as LTE-U or LAA).

Figure 1A:
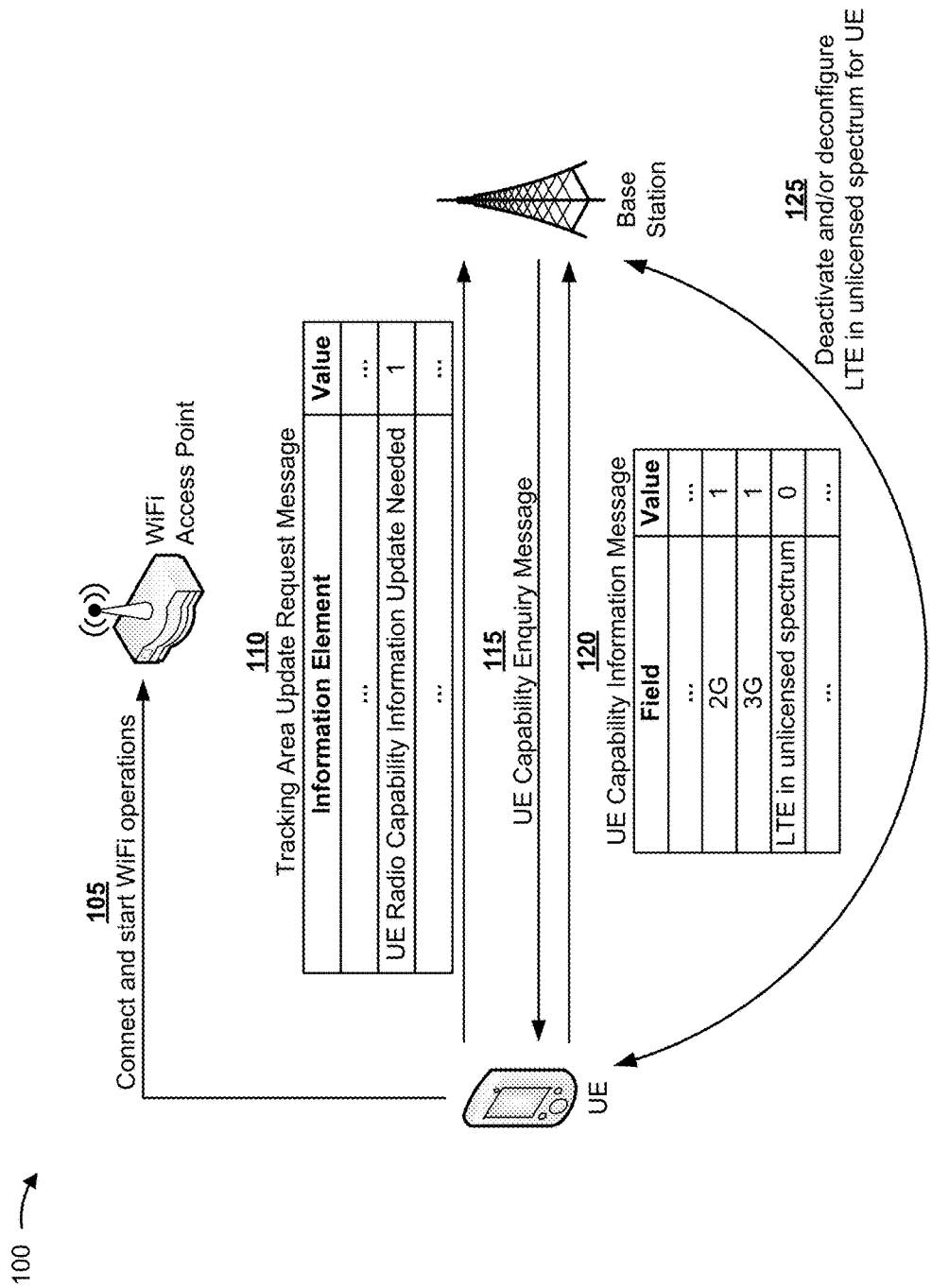
FIGS. 1A and 1B are diagrams of an overview of an example implementation described herein.
Figure 1B:
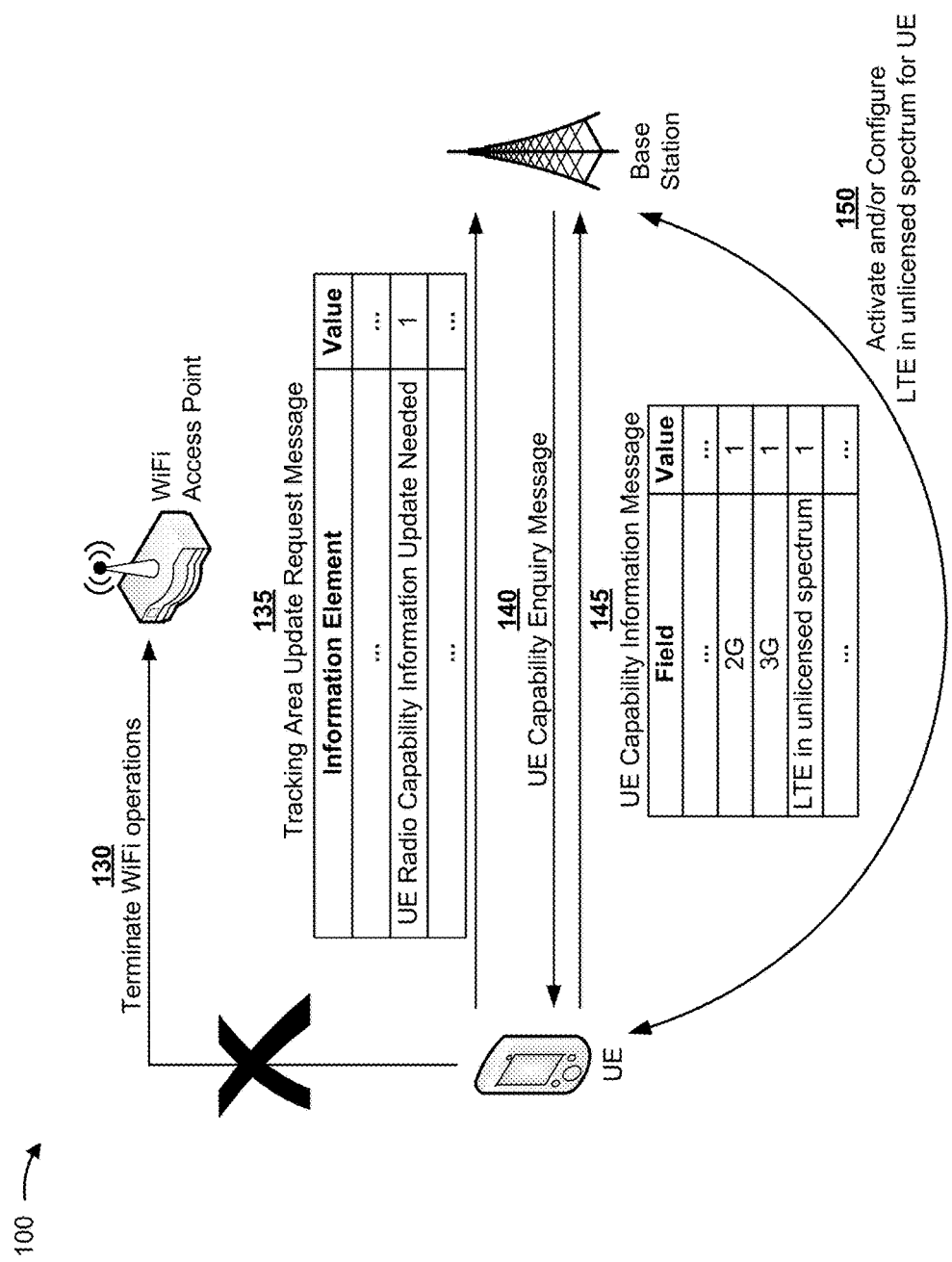

FIGS. 1A and 1B are diagrams of an overview of an example implementation 100 described herein. Although the example implementation 100 is described in the context of WiFi operations via a WiFi access point, the implementations described herein may be applicable to WLAN operations via any suitable wireless access point and any suitable WLAN.

As shown in FIG. 1A, assume that a user equipment (UE) is capable of performing WiFi operations via a WiFi access point and also supporting LTE in unlicensed spectrum service via a wireless operator's base station. Further assume that the WiFi operations and LTE in unlicensed spectrum service may both use the same unlicensed RF spectrum band (e.g., the 5 GHz RF spectrum band).

As shown by reference number 105, the UE may connect to the WiFi access point and start WiFi operations using the unlicensed RF spectrum band. As shown by reference number 110, the UE may send a tracking area update request message to the base station. The tracking area update request message may include an optional element, UE Radio Capability Information Update Needed, which may cause the base station to initiate a radio resource control (RRC) capabilities exchange with the UE. The base station may initiate the RRC capabilities exchange with the UE by sending a UE capability enquiry message to the UE, as shown by reference number 115. In response to the UE capability enquiry message, the UE may send a UE capability information message to the base station, as shown by reference number 120. The UE capability information message may update the base station with the UE's radio capabilities (e.g., indicating that the UE supports second generation (2G) and third generation (3G) radio services, but not LTE in unlicensed spectrum service). Based on receiving the UE capability information message indicating that the UE does not support LTE in unlicensed spectrum service, the base station may deactivate and/or deconfigure, as needed, LTE in unlicensed spectrum service for the UE, as shown by reference number 125.

As shown in FIG. 1B and by reference number 130, assume that the UE has terminated WiFi operations to the WiFi access point using the unlicensed RF spectrum band (e.g., by stopping WiFi operations or by changing WiFi operations to a different RF spectrum band). As shown by reference number 135, the UE may send a tracking area update request message to the base station. The tracking area update request message may include the optional element, UE Radio Capability Information Update Needed, which may cause the base station to initiate an RRC capabilities exchange with the UE. The base station may initiate the RRC capabilities exchange with the UE by sending a UE capability enquiry message to the UE, as shown by reference number 140. In response to the UE capability enquiry message, the UE may send a UE capability information message to the base station, as shown by reference number 145. The UE capability information message may update the base station with the UE's radio capabilities (e.g., indicating that the UE supports 2G, 3G, and LTE in unlicensed spectrum services). Based on receiving the UE capability information message indicating that the UE supports LTE in unlicensed spectrum service, the base station may configure and/or activate, as needed, LTE in unlicensed spectrum service for the UE, as shown by reference number 150.

In this way, the UE may cause the base station to disable LTE in unlicensed spectrum service when the UE is engaged in WiFi operations when the LTE in unlicensed spectrum service and the WiFi operations use the same RF spectrum band. Permitting the UE to cause the base station to disable LTE in unlicensed spectrum service when the UE is engaged in WiFi operations may avoid interference between LTE in unlicensed spectrum service and WiFi operations on the same RF spectrum band. Thus, implementations described herein may allow a UE to selectively engage in LTE in unlicensed spectrum service or WiFi operations.

As indicated above, FIGS. 1A and 1B are provided merely as an example. Other examples are possible and may differ from what was described with regard to FIGS. 1A and 1B.

Figure 2:
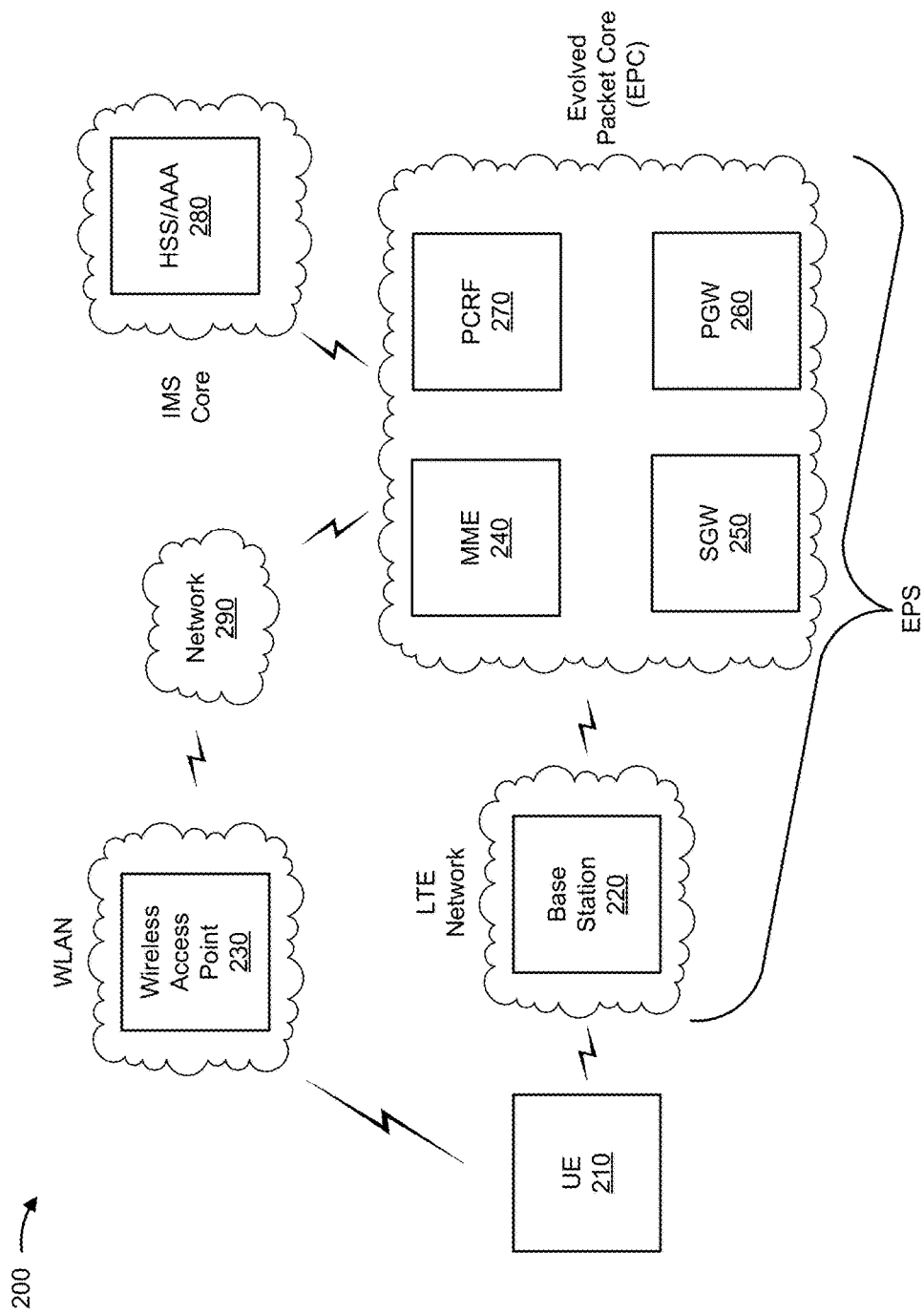
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment (UE) 210; a base station 220; a wireless access point 230; a mobility management entity device (MME) 240; a serving gateway (SGW) 250; a packet data network gateway (PGW) 260; a policy charging and rules function (PCRF) 270; a home subscriber server/authentication, authorization, and accounting server (HSS/AAA) 280; and a network 290. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 220 that take the form of evolved Node Bs (eNBs) via which UE 210 communicates with the EPC. The EPC may include MME 240, SGW 250, PGW 260, and/or PCRF 270 that enable UE 210 to communicate with network 290 and/or an Internet protocol (IP) multimedia subsystem (IMS) core. The IMS core may include HSS/AAA 280, and may manage device registration and authentication, session initiation, etc., associated with UE 210. HSS/AAA 280 may reside in the EPC and/or the IMS core.

UE 210 may include one or more devices capable of communicating with base station 220, wireless access point 230, and/or a network (e.g., network 290). For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses, a smart watch, etc.), a machine device, a machine-to-machine (M2M) device, an "Internet of Things" (IoT) device, and/or a similar device. UE 210 may send traffic to and/or receive traffic from network 290 (e.g., via base station 220, wireless access point 230, SGW 250, and/or PGW 260).

Base station 220 may include one or more devices capable of transferring traffic, such as audio, video, text, and/or other traffic, destined for and/or received from UE 210. In some implementations, base station 220 may include an eNB associated with the LTE network that receives traffic from and/or sends traffic to network 290 via SGW 250 and/or PGW 260. Additionally, or alternatively, one or more base stations 220 may be associated with a radio access network that is not associated with the LTE network. Base station 220 may send traffic to and/or receive traffic from UE 210 via an air interface. In some implementations, base station 220 may include a small cell base station, such as a base station of a microcell, a picocell, and/or a femtocell.

In some implementations, base station 220 may provide UE 210 with access to an unlicensed RF spectrum band to permit UE 210 to communicate using the unlicensed RF spectrum band. In some implementations, the unlicensed RF spectrum band may be used by base station 220 and UE 210 of a cellular network, for LTE communications and/or LTE-Advanced (LTE-A) communications, and by WLAN access points (e.g., wireless access point 230) and WLAN stations of a WLAN, for WLAN communications. The unlicensed RF spectrum band may be used by the cellular network in combination with, or independent from, a licensed RF spectrum band. In some implementations, the unlicensed RF spectrum band may be an RF spectrum band for which UE 210 may need to contend for access because the RF spectrum band is available, at least in part, for other unlicensed uses, such as WLAN use.

As an example, the unlicensed RF spectrum band may include one or more radio frequencies (e.g., one or more radio frequency spectrum bands) included in the radio spectrum (e.g., the portion of the electromagnetic spectrum corresponding to radio frequencies, or frequencies lower than approximately 300 gigahertz (GHz)). In some implementations, the unlicensed RF spectrum band may include one or more RF spectrum bands that are open for shared use by any device that complies with regulatory agency rules (e.g., associated with a particular country) for communicating via the one or more RF spectrum bands. For example, the unlicensed RF spectrum band may include one or more radio frequencies between approximately 5 GHz and approximately 6 GHz (e.g., the 5 GHz RF spectrum band). As a more specific example, the unlicensed RF spectrum band may include one or more radio frequencies between approximately 5.15 GHz and approximately 5.825 GHz. In some implementations, the unlicensed RF spectrum band may include one or more radio frequencies in the 2.4 GHz RF spectrum band.

Wireless access point 230 may include one or more devices, associated with a WLAN, that may receive, process, and/or transmit data traffic, such as audio, video, text, and/or other data traffic, destined for and/or received from UE 210 and/or network 290. For example, wireless access point 230 may include a router, a bridge, a gateway, a base station, or another type of network device. In some implementations, wireless access point 230 may regulate access to the associated WLAN. In some implementations, wireless access point 230 may be a WiFi access point for an associated WiFi network. In some implementations, WiFi interfaces, WiFi devices, and/or WiFi networks may include interfaces, devices, and/or networks that communicate wirelessly (e.g., using the 2.4 GHz and 5 GHz RF spectrum bands) using a WLAN based on the Institute of Electrical and Electronics Engineers' (IEEE) 802.11 standards (e.g., WiFi).

MME 240 may include one or more devices, such as one or more server devices, capable of managing authentication, activation, deactivation, and/or mobility functions associated with UE 210. In some implementations, MME 240 may perform operations relating to authentication of UE 210. Additionally, or alternatively, MME 240 may facilitate the selection of a particular SGW 250 and/or a particular PGW 260 to serve traffic to and/or from UE 210. MME 240 may perform operations associated with handing off UE 210 from a first base station 220 to a second base station 220 when UE 210 is transitioning from a first cell associated with the first base station 220 to a second cell associated with the second base station 220. Additionally, or alternatively, MME 240 may select another MME (not pictured), to which UE 210 should be handed off (e.g., when UE 210 moves out of range of MME 240).

SGW 250 may include one or more devices capable of routing packets. For example, SGW 250 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 250 may aggregate traffic received from one or more base stations 220 associated with the LTE network, and may send the aggregated traffic to network 290 (e.g., via PGW 260) and/or other network devices associated with the EPC and/or the IMS core. SGW 250 may also receive traffic from network 290 and/or other network devices, and may send the received traffic to UE 210 via base station 220. Additionally, or alternatively, SGW 250 may perform operations associated with handing off UE 210 to and/or from an LTE network.

PGW 260 may include one or more devices capable of providing connectivity for UE 210 to external packet data networks (e.g., other than the depicted EPC and/or LTE network). For example, PGW 260 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, PGW 260 may aggregate traffic received from one or more SGWs 250, and may send the aggregated traffic to network 290. Additionally, or alternatively, PGW 260 may receive traffic from network 290, and may send the traffic to UE 210 via SGW 250 and base station 220. PGW 260 may record data usage information (e.g., byte usage), and may provide the data usage information to HSS/AAA 280.

PCRF 270 may include one or more network devices, or other types of communication devices. PCRF 270 may store subscriber information, such as voice call and data rate plans or quotas for subscribers. PCRF 270 may provide network control regarding service data flow detection, gating, QoS, and/or flow-based charging. Policies and rules regarding QoS may include policies and rules instructing UE 210 and/or network elements (base station 220, MME 240, SGW 250, PGW 260, etc.) to minimize packet loss, to implement a packet delay budget, to provide a guaranteed bit rate (GBR), to provide a particular latency, to reduce RF signal congestion, and/or to perform other activities associated with QoS. PCRF 270 may provide policies and rules to other network devices, such as base station 220, SGW 250, PGW 260, or the like, to implement network control. PCRF 270 may determine how a certain service data flow shall be treated, and may ensure that user plane traffic mapping and QoS is in accordance with a user's profile and/or network policies.

HSS/AAA 280 may include one or more devices, such as one or more server devices, capable of managing (e.g., receiving, generating, storing, processing, and/or providing) information associated with UE 210. For example, HSS/AAA 280 may manage subscription information associated with UE 210, such as information that identifies a subscriber profile of a user associated with UE 210, information that identifies services and/or applications that are accessible to UE 210, location information associated with UE 210, a network identifier (e.g., a network address) that identifies UE 210, information that identifies a treatment of UE 210 (e.g., quality of service information, a quantity of minutes allowed per time period, a quantity of data consumption allowed per time period, etc.), and/or similar information. HSS/AAA 280 may provide this information to one or more other devices of environment 200 to support the operations performed by those devices.

HSS/AAA 280 may include one or more devices, such as one or more server devices, that perform authentication, authorization, and/or accounting operations for communication sessions associated with UE 210. For example, HSS/AAA 280 may perform authentication operations for UE 210 and/or a user of UE 210 (e.g., using one or more credentials), may control access, by UE 210, to a service and/or an application (e.g., based on one or more restrictions, such as time-of-day restrictions, location restrictions, single or multiple access restrictions, read/write restrictions, etc.), may track resources consumed by UE 210 (e.g., a quantity of voice minutes consumed, a quantity of data consumed, etc.), and/or may perform similar operations.

Network 290 may include one or more wired and/or wireless networks. For example, network 290 may include a cellular network (e.g., an LTE network, a 3G network, a CDMA network, etc.), a public land mobile network (PLMN), a WLAN (e.g., a WiFi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
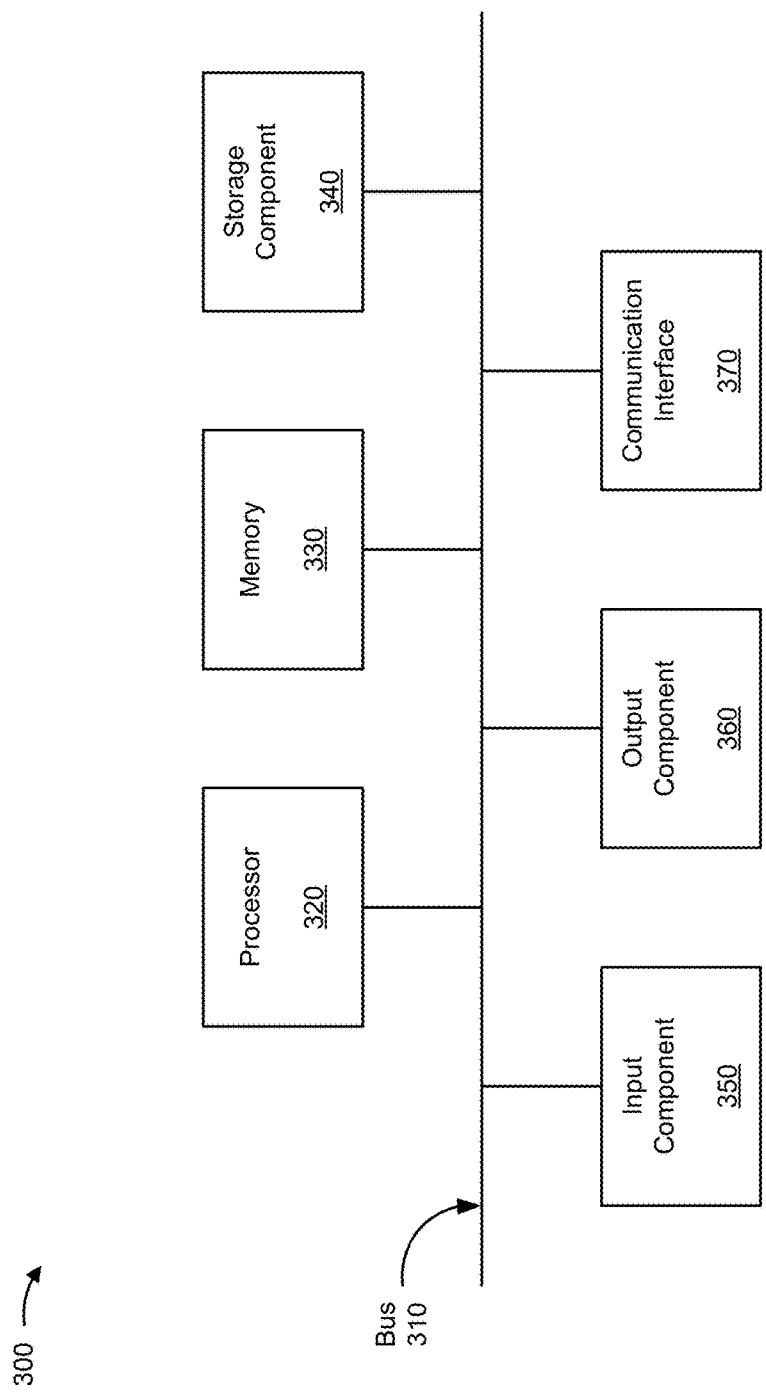
FIG. 3 is a diagram of example components of one or more devices of FIG. 2.

FIG. 3 is a diagram of example components of a device 300. Device 300 may correspond to UE 210, base station 220, wireless access point 230, MME 240, SGW 250, PGW 260, PCRF 270, and/or HSS/AAA 280. In some implementations, UE 210, base station 220, wireless access point 230, MME 240, SGW 250, PGW 260, PCRF 270, and/or HSS/AAA 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a WiFi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
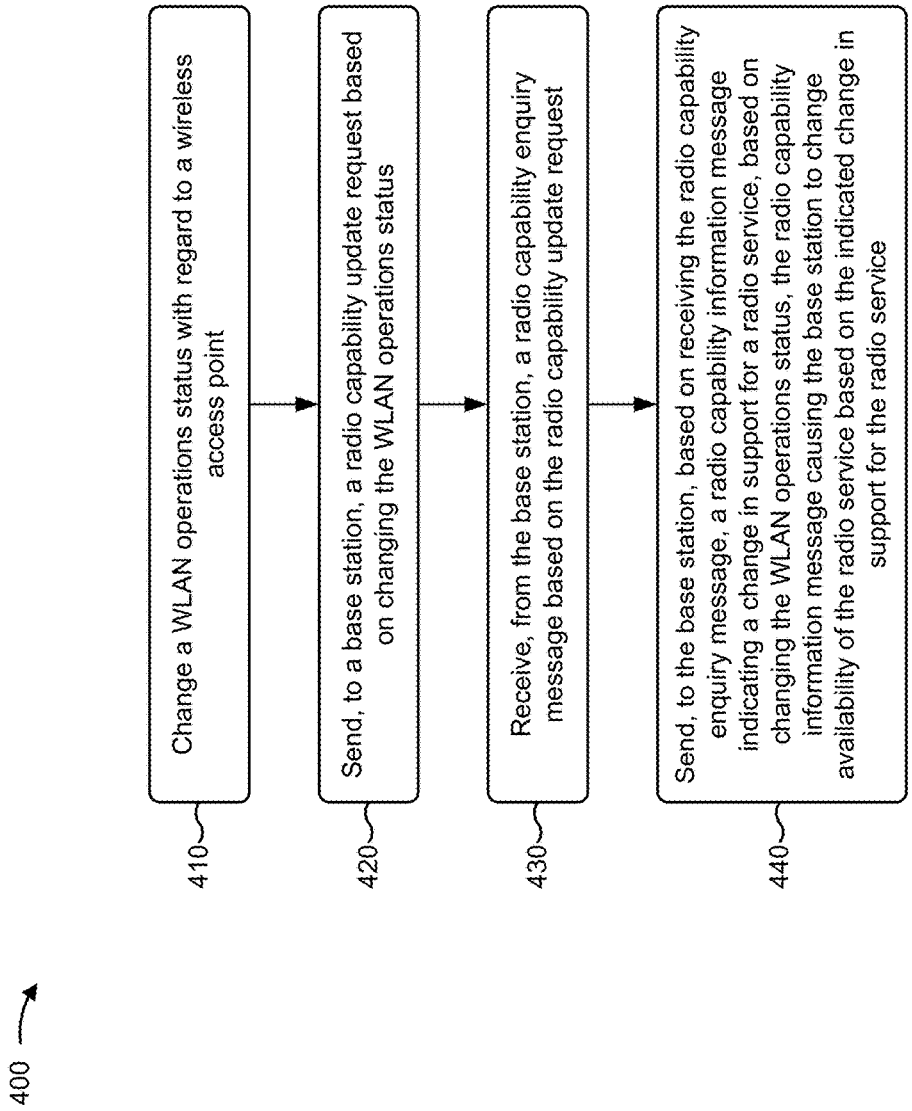
FIG. 4 is a flow chart of an example process for disabling user equipment radio communication over an unlicensed radio frequency spectrum band during WLAN operations.

FIG. 4 is a flow chart of an example process 400 for disabling user equipment radio communication over an unlicensed radio frequency spectrum band during WLAN operations. In some implementations, one or more process blocks of FIG. 4 may be performed by UE 210. In some implementations, one or more process blocks of FIG. 4 may be performed by another device or a group of devices separate from or including UE 210, such as base station 220, wireless access point 230, MME 240, SGW 250, PGW 260, PCRF 270, and/or HSS/AAA 280.

As shown in FIG. 4, process 400 may include changing a WLAN operations status with regard to a wireless access point (block 410). For example, UE 210 may change UE 210's WLAN operations status (e.g., UE 210's WiFi operations status) upon connecting to wireless access point 230 (e.g., a WiFi access point) or while UE 210 is connected with wireless access point 230.

In some implementations, UE 210's WLAN operations status may change when UE 210 connects with wireless access point 230 and starts WLAN operations using an unlicensed RF spectrum band (e.g., the 5 GHz RF spectrum band) that might also be used for communication with a wireless operator's radio access network (e.g., for LTE in unlicensed spectrum service, such as LTE-U or LAA). In some implementations, UE 210's WLAN operations status may change when UE 210 has completed WLAN operations with wireless access point 230. For example, UE 210's WLAN operations status may change when UE 210 has completed WLAN operations on the unlicensed RF spectrum band (e.g., the 5 GHz RF spectrum band) that is being used for communication with the wireless operator's radio access network (e.g., for LTE in unlicensed spectrum service, such as LTE-U or LAA). In some implementations, UE 210's WLAN operations status may change when UE 210 changes WLAN operations to an RF spectrum band (e.g., the 2.4 GHz RF spectrum band) other than the unlicensed RF spectrum band (e.g., the 5 GHz RF spectrum band) that is being used for communication with the wireless operator's radio access network (e.g., for LTE in unlicensed spectrum service, such as LTE-U or LAA).

As further shown in FIG. 4, process 400 may include sending, to a base station, a radio capability update request based on changing the WLAN operations status (block 420). For example, when UE 210 changes UE 210's WLAN operations status, UE 210 may send, to base station 220, a radio capability update request.

In some implementations, the radio capability update request may be based on a modification of the tracking area update procedure for a wireless network that is defined in 3GPP Technical Specification 24.301, Release 13, version 13.4.0 (3GPP TS 24.301) (hereinafter "3GPP tracking area update procedure"). The currently defined 3GPP tracking area update procedure may not be able to update the wireless network with changes in a user equipment's LTE radio capabilities, and the wireless network may need to initiate a radio resource control (RRC) capabilities exchange with the user equipment. However, the user equipment may request that the wireless network initiate a tracking area update, which may include the RRC capabilities exchange, so that the user equipment can update the wireless network with changes to the user equipment's 2G, 3G and/or LTE radio capabilities. For example, the user equipment may request that the wireless network initiate the tracking area update (including the RRC capabilities exchange) by sending a TRACKING AREA UPDATE REQUEST message (as defined in 3GPP TS 24.301) that includes the optional "UE Radio Capability Information Update Needed" information element. Based on receipt, from the user equipment, of a TRACKING AREA UPDATE REQUEST message that includes the optional "UE Radio Capability Information Update Needed" information element, the wireless network may initiate the tracking area update (including the RRC capabilities exchange) with the user equipment.

In some implementations, the radio capability update request, sent by UE 210, to base station 220 (e.g., an eNB), may be a TRACKING AREA UPDATE REQUEST message (as defined in 3GPP TS 24.301) that includes an information element (e.g., one or more bits, such as the optional "UE Radio Capability Information Update Needed" information element) that causes base station 220 to initiate an RRC capabilities exchange with UE 210. In some implementations, UE 210 may send the TRACKING AREA UPDATE REQUEST message to base station 220 using the licensed RF spectrum band for the LTE network.

As further shown in FIG. 4, process 400 may include receiving, from the base station, a radio capability enquiry message based on the radio capability update request (block 430). For example, UE 210 may receive, from base station 220, a radio capability enquiry message based on the radio capability update request that UE 210 sent to base station 220.

In some implementations, the radio capability update request, sent by UE 210 to base station 220, may cause the base station 220 to initiate an RRC capabilities exchange with UE 210. For example, the optional "UE Radio Capability Information Update Needed" information element in the TRACKING AREA UPDATE REQUEST message may cause base station 220 to send, to UE 210, a radio capability enquiry message. In some implementations, the radio capability enquiry message may be a UECapabilityEnquiry message, as defined in 3GPP Technical Specification 36.331, Release 12, version 12.7.0 (hereinafter "3GPP TS 36.331").

In some implementations, MME 240 may cause base station 220 to initiate the RRC capabilities exchange with UE 210 based on the radio capability update request that UE 210 sent to base station 220. For example, the optional "UE Radio Capability Information Update Needed" information element in the TRACKING AREA UPDATE REQUEST message may cause MME 240 to instruct base station 220 to send, to UE 210, the UECapabilityEnquiry message.

As further shown in FIG. 4, process 400 may include sending, to the base station, based on receiving the radio capability enquiry message, a radio capability information message indicating a change in support for a radio service (based on changing the WLAN operations status), the radio capability information message causing the base station to change availability of the radio service based on the indicated change in support for the radio service (block 440). For example, UE 210 may send, to base station 220, a radio capability information message based on UE 210 receiving, from base station 220, the radio capability enquiry message. In some implementations, UE 210 may send, to base station 220, the radio capability information message, in response to UE 210 receiving, from base station 220, the radio capability enquiry message.

The radio capability information message may indicate a change in support for a radio service, based on a changed WLAN operations status. For example, the radio capability information message may indicate that UE 210 has changed UE 210's support for a radio service (e.g., to does support or to does not support) based on UE 210 having changed UE 210's WLAN operations status.

In some implementations, the radio capability information message may include information to update a list of all of UE 210's radio capabilities, based on UE 210 changing UE 210's WLAN operations status, including removing capabilities that UE 210 does not support and/or adding capabilities that UE 210 does support. For example, the radio capability information message may include an indication to remove, as a radio capability for UE 210, the capability to communicate with a wireless operator's radio access network using an unlicensed RF spectrum band (e.g., the 5 GHz RF spectrum band) when UE 210 starts WLAN operations using the same unlicensed RF spectrum band. In some implementations, the radio capability information message may include an indication to add, as a radio capability for UE 210, the capability to communicate with a wireless operator's radio access network using an unlicensed RF spectrum band when UE 210 completes WLAN operations or changes WLAN operations to a different unlicensed RF spectrum band (e.g., the 2.4 GHz RF spectrum band).

In some implementations where the radio capability enquiry message is a UECapabilityEnquiry message, UE 210 may respond, to base station 220, with a UECapabilityInformation message, as defined in 3GPP TS 36.331. The UECapabilityInformation message may include one or more fields (e.g., bits) indicating radio access capabilities that UE 210 supports or does not support. In some implementations, UE 210 may use the UECapabilityInformation message to update all of UE 210's radio capabilities, including removing radio capabilities that UE 210 does not support and adding radio capabilities that UE 210 supports. For example, when UE 210 starts WLAN operations on an unlicensed RF spectrum band (e.g., the 5 GHz RF spectrum band) being used for LTE in unlicensed spectrum service, and becomes unavailable for LTE in unlicensed spectrum service on that unlicensed RF spectrum band, the UECapabilityInformation message may include one or more fields indicating that UE 210 does not support LTE in unlicensed spectrum service on that unlicensed RF spectrum band. In some implementations, when UE 210 completes WLAN operations, and becomes available for LTE in unlicensed spectrum service, the UECapabilityInformation message may include one or more fields indicating that UE 210 supports LTE in unlicensed spectrum service. In some implementations, when UE 210 changes WLAN operations to a different RF spectrum band (e.g., the 2.4 GHz RF spectrum band) and becomes available for LTE in unlicensed spectrum service (e.g., on the 5 GHz RF spectrum band), the UECapabilityInformation message may include one or more fields indicating that UE 210 supports LTE in unlicensed spectrum service.

The radio capability information message may cause base station 220 to change the availability of a radio service based on the indicated change in support for the radio service. For example, the radio capability information message, sent by UE 210, to base station 220, may cause base station 220 to make available or discontinue, for UE 210, certain radio services based on the radio capability information message. In some implementations, when the radio capability information message (e.g., the UECapabilityInformation message) indicates that UE 210 does not support LTE in unlicensed spectrum service, base station 220 may deactivate LTE in unlicensed spectrum service (e.g., if LTE in unlicensed spectrum service is configured and active) and/or deconfigure LTE in unlicensed spectrum service (e.g., if LTE in unlicensed spectrum service is configured, but not active), as needed. In some implementations, when the radio capability information message (e.g., the UECapabilityInformation message) indicates that UE 210 supports LTE in unlicensed spectrum service, base station 220 may activate LTE in unlicensed spectrum service (e.g., if LTE in unlicensed spectrum service is configured, but not active) and/or configure LTE in unlicensed spectrum service (if LTE in unlicensed spectrum service is not configured), as needed.

In some implementations, a hysteresis timer may be used with one or more blocks of process 400. The hysteresis timer may be used to avoid repeatedly cycling (e.g., a ping pong situation) through one or more blocks of process 400. For example, UE 210 and/or base station 220 may include a hysteresis timer to avoid repeatedly cycling through one or more blocks of process 400 (e.g., UE 210 repeatedly sending radio capability update requests; base station 220 repeatedly initiating RRC capabilities exchanges; base station 220 repeatedly deactivating, deconfiguring, configuring, and activating LTE in unlicensed spectrum service, etc.), such as when UE 210 has an intermittent connection with wireless access point 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may permit user equipment to cause a wireless operator's base station to disable radio services (e.g., LTE radio services) using an unlicensed RF spectrum band when the user equipment is using the unlicensed RF spectrum band for WLAN operations. Disabling radio services (e.g., LTE radio services) using an unlicensed RF spectrum band when user equipment is using the unlicensed RF spectrum band for WLAN operations may reduce potential interference between WLAN operations and using the unlicensed RF spectrum band to communicate with a wireless operator's radio access network (e.g., for LTE in unlicensed spectrum service, such as LTE-U or LAA). In some implementations, disabling radio services using an unlicensed RF spectrum band when user equipment is using the unlicensed RF spectrum band for WLAN operations may conserve user equipment processor and/or memory resources that might be expended, such as when the user equipment may need to retry communications due to interference between WLAN operations and using the unlicensed RF spectrum band to communicate with a wireless operator's radio access network (e.g., for LTE in unlicensed spectrum service, such as LTE-U or LAA).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user equipment (UE), comprising:
a memory; and
one or more processors to:
connect to a wireless access point for wireless local area network (WLAN) operations in an unlicensed radio frequency (RF) spectrum band;

change, for the UE, a WLAN operations status with regard to the wireless access point;
send, to a base station, a request based on changing the WLAN operations status for the UE,
the request to cause the base station to send, to the UE, a first radio capability message based on the request;
receive, from the base station, the first radio capability message; and
send, to the base station, a second radio capability message based on receiving the first radio capability message,
the second radio capability message:
indicating, by the UE, that the UE no longer supports a radio service based on changing the WLAN operations status for the UE and an indication to remove a capability to communicate with the radio service when the UE starts the WLAN operations on a same unlicensed spectrum band as being used by the radio service, and
causing the base station to change availability of the radio service based on the UE no longer supporting the radio service.

2. The UE of claim 1,
where the one or more processors, when changing, for the UE, the WLAN operations status with regard to the wireless access point, are to:
start the WLAN operations in the unlicensed RF spectrum band, for the UE, with the wireless access point; and
where the second radio capability message, when causing the base station to change availability of the radio service based on the UE no longer supporting the radio service, causes the base station to discontinue the radio service, in the unlicensed RF spectrum band, for the UE.

3. The UE of claim 1,
where the one or more processors, are further to:
stop the WLAN operations in the unlicensed RF spectrum band, for the UE, with the wireless access point;
send, to the base station, a second request based on stopping the WLAN operations,
the request to cause the base station to send, to the UE, a third radio capability message based on the request;
receive, from the base station, the third radio capability message; and
send, to the base station, a fourth radio capability message based on receiving the third radio capability message,
where the fourth radio capability message, when causing the base station to change availability of the radio service based on stopping the WLAN operations, causes the base station to configure the radio service, in the unlicensed RF spectrum band, for the UE.

4. The UE of claim 3,
where the unlicensed RF spectrum band is a first RF spectrum band; and
where the one or more processors, when stopping the WLAN operations in the unlicensed RF spectrum band, for the UE, with the wireless access point, are to:
change the WLAN operations to a second RF spectrum band different from the first RF spectrum band.

5. The UE of claim 1, where:
the radio service is a long term evolution (LTE) in unlicensed spectrum service;
the request is a TRACKING AREA UPDATE REQUEST message that includes a UE Radio Capability Information Update Needed information element;
the first radio capability message is a UECapabilityEnquiry message; and
the second radio capability message is a UECapabilityInformation message.

6. The UE of claim 1, where at least one of the request or the second radio capability message cause the base station to start a hysteresis timer.

7. The UE of claim 1, where the second radio capability message, when causing the base station to change availability of the radio service based on the UE no longer supporting the radio service, causes the base station to disable the radio service for the UE to allow the UE to selectively engage with either the radio the WLAN operations.

8. A non-transitory computer-readable medium storing instructions, the instructions comprising:
one or more instructions that, when executed by one or more processors, cause the one or more processors to:
connect to a wireless access point for wireless local area network (WLAN) operations in an unlicensed radio frequency (RF) spectrum band;
change, for a user equipment (UE), a WLAN operations status with regard to the wireless access point;
send, to a base station, a request based on changing the WLAN operations status for the UE,
the request to cause the base station to send, to the UE, a first message based on the request;
receive, from the base station, the first message; and
send, to the base station, a second message based on the first message,
the second message causing the base station to change availability of a radio service based on changing the WLAN operations status for the UE and an indication to remove a capability to communicate with the radio service when the UE starts the WLAN operations on a same unlicensed spectrum band as being used by the radio service.

9. The non-transitory computer-readable medium of claim 8,
where the one or more instructions, that cause the one or more processors to change, for the UE, the WLAN operations status with regard to the wireless access point, cause the one or more processors to:
start the WLAN operations in the unlicensed RF spectrum band, for the UE, with the wireless access point; and
where the second message, when causing the base station to change availability of the radio service based on changing the WLAN operations status for the UE, causes the base station to discontinue the radio service, in the unlicensed RF spectrum band, for the UE.

10. The non-transitory computer-readable medium of claim 8, where the one or more instructions further cause the one or more processors to:
stop the WLAN operations in the unlicensed RF spectrum band, for the UE, with the wireless access point;
send, to the base station, a second request based on stopping the WLAN operations,
the request to cause the base station to send, to the UE, a third radio capability message based on the request;
receive, from the base station, the third radio capability message; and send, to the base station, a fourth radio capability message based on receiving the third radio capability message, where the fourth radio capability message, when causing the base station to change availability of the radio service based on based on stopping the WLAN operations, causes the base station to activate the radio service, in the unlicensed RF spectrum band, for the UE.

11. The non-transitory computer-readable medium of claim 10,
where the unlicensed RF spectrum band is a first RF spectrum band; and
where the one or more instructions, that cause the one or more processors to stop the WLAN operations in the unlicensed RF spectrum band, for the UE, with the wireless access point, cause the one or more processors to:
change the WLAN operations to a second RF spectrum band different from the first RF spectrum band.

12. The non-transitory computer-readable medium of claim 8, where:
the radio service is a long term evolution (LTE) in unlicensed spectrum service;
the request is a TRACKING AREA UPDATE REQUEST message that includes a UE Radio Capability Information Update Needed information element;
the first message is a UECapabilityEnquiry message; and
the second message is a UECapabilityInformation message.

13. The non-transitory computer-readable medium of claim 8, where at least one of the request or the second message cause the base station to start a hysteresis timer.

14. The non-transitory computer-readable medium of claim 8, where the second message, when causing the base station to change availability of the radio service based on changing the WLAN operations status for the UE, causes the base station to disable the radio service for the UE to allow the UE to selectively engage the WLAN operations.

15. A method, comprising:
connecting, by a user equipment (UE), to a wireless access point for wireless local area network (WLAN) operations in an unlicensed radio frequency (RF) spectrum band;
changing, by the UE, a WLAN operations status, for the UE, with regard to the wireless access point;
sending, by the UE, to a base station, a radio capability update request based on changing the WLAN operations status for the UE,
the radio capability update request to cause the base station to send, to the UE, a radio capability enquiry message based on the radio capability update request;
receiving, by the UE, from the base station, the radio capability enquiry message; and
sending, by the UE, to the base station, a radio capability information message in response to the radio capability enquiry message received by the UE,
the radio capability information message to cause the base station to change availability, for the UE, of a radio service based on changing the WLAN operations status, for the UE, with regard to the wireless access point and an indication to remove a capability to communicate with the radio service when the UE starts the WLAN operations on a same unlicensed spectrum band as being used by the radio service.

16. The method of claim 15,
where changing the WLAN operations status, for the UE, with regard to the wireless access point comprises:
starting the WLAN operations in the unlicensed RF spectrum band, for the UE, with the wireless access point; and
where the radio capability information message, to cause the base station to change availability, for the UE, of the radio service, causes the base station to discontinue the radio service, in the unlicensed RF spectrum band, for the UE.

17. The method of claim 15, further comprising:
stopping the WLAN operations in the unlicensed RF spectrum band, for the UE, with the wireless access point; and
where the radio capability information message, to cause the base station to change availability, for the UE, of the radio service, causes the base station to configure the radio service, in the unlicensed RF spectrum band, for the UE.

18. The method of claim 17,
where the unlicensed RF spectrum band is a first RF spectrum band; and
where stopping the WLAN operations in the unlicensed RF spectrum band, for the UE, with the wireless access point comprises:
changing the WLAN operations to a second RF spectrum band different from the first RF spectrum band.

19. The method of claim 15, where:
the radio service is a long term evolution (LTE) in unlicensed spectrum service;
the LTE in unlicensed spectrum service uses the unlicensed RF spectrum band;
the radio capability update request is a TRACKING AREA UPDATE REQUEST message that includes a UE Radio Capability Information Update Needed information element;
the radio capability enquiry message is a UECapabilityEnquiry message; and
the radio capability information message is a UECapabilityInformation message.

20. The method of claim 15, where at least one of the radio capability update request or the radio capability information message cause the base station to start a hysteresis timer.

* * * * *